(No Model.)
J. H. EDSON.
APPARATUS FOR TOOLING MARBLE OR OTHER MATERIAL.
No. 466,161. Patented Dec. 29, 1891.
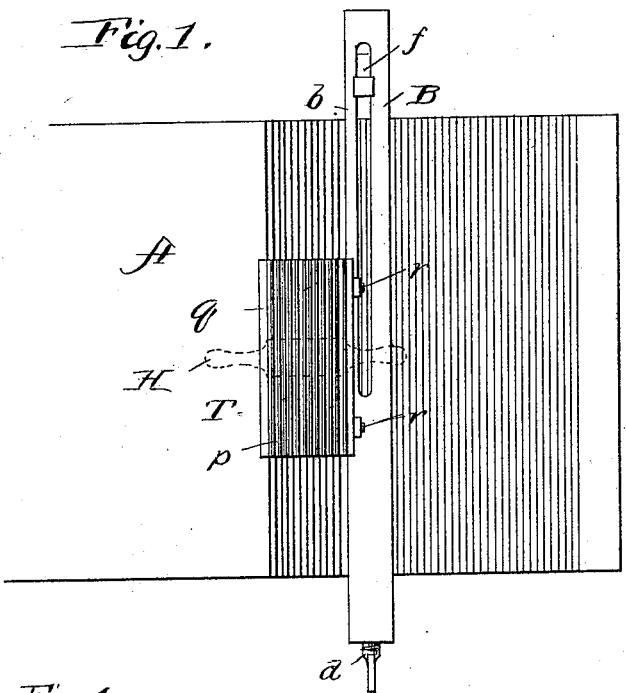
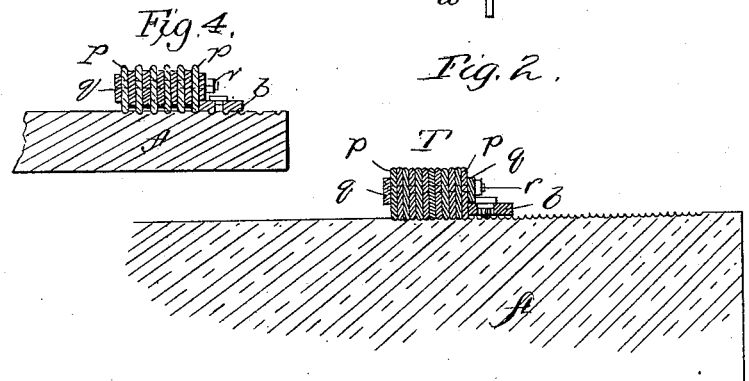
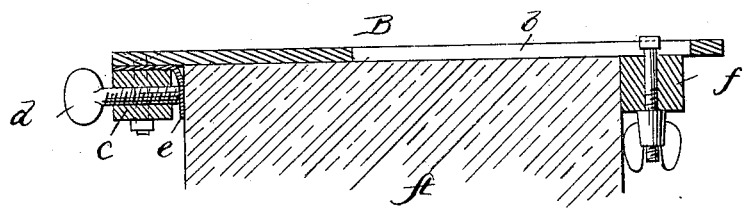
Witnesses
W. P. Keene
F. L. Middleton
Inventor
James H. Edson
by Ellis Spear
Atty

UNITED STATES PATENT OFFICE.

JAMES H. EDSON, OF RUTLAND, ASSIGNOR OF ONE-HALF TO THE VERMONT MARBLE COMPANY, OF PROCTOR, VERMONT.

APPARATUS FOR TOOLING MARBLE OR OTHER MATERIAL.

SPECIFICATION forming part of Letters Patent No. 466,161, dated December 29, 1891.

Application filed November 29, 1890. Serial No. 373,078. (No model.)

*To all whom it may concern:*

Be it known that I, JAMES H. EDSON, a citizen of the United States of America, residing at Rutland, in the county of Rutland and State of Vermont, have invented certain new and useful Improvements in Apparatus for Tooling Marble or other Material, of which the following is a specification.

My said invention is a machine for finishing marble or other stone or equivalent material in the manner known as "tooled" or "grooved" work. This work consists of fine grooves formed upon the surface of the block to give a shaded or dulled effect. Heretofore such work has been done by mallet and chisel, which kind of hand-work is expensive.

The object of the invention is to produce a simple form of tool for grooving marble or other stone or equivalent material in connection with water and sand, chilled shot, steel, ground glass, or other material used in cutting marble or other material. The tool may be a plate, rod, or wire, or a series thereof, according to the number of grooves to be worn or abraded simultaneously and by one tool. The transverse diameter of the edge of the plate or of the rod or wire depends upon the width of the groove. The edge or edges are placed upon the stone and moved back and forth across the face in connection with sand and water or other abrading material until the groove or grooves are worn to the required depth in the stone. Then the tool is shifted laterally onto new ground and the work carried on in this manner until the whole surface is completed. For more rapid and accurate work it is desirable that the tool should be guided. It may be caused to reciprocate by hand or may be run by power applied in any convenient way.

In the accompanying drawings I have shown the mechanism which I have devised for carrying out the objects stated.

In the drawings, Figure 1 shows the apparatus in place upon a block. Fig. 2 shows a transverse section of Fig. 1. Fig. 3 shows a longitudinal section of the guide. Fig. 4 shows a modification.

In the drawings, A represents a block of marble or other material the face of which is to be grooved. Upon this block is clamped an adjustable guide B. This consists of a slotted bar $b$, on one end of which is fixed a block $c$, having a set-screw $d$, which bears against a plate $e$. A sliding block $f$ is held adjustably by means of a stem and nut, the stem passing through the slot. The movable block is set up against the side of the stone when the guide is in place, as shown in Fig. 1, and then the set-screw $d$ is turned up to press the plate against the stone and bind the guide firmly in place. Thus the guide, which is a plain straight bar, lies upon the face of the stone and is held firmly in place.

The tool or movable part is shown at T. It consists of a number of plates $p$, the edges of which are rounded and in the shape suitable to form grooves in the stone. The bars are clamped together by means of narrow supporting or clamping bars of less width than the plates, (marked $q$,) these being held by bolts $r$, provided with nuts, which bolts pass through the plates and supporting portions. I have shown the plates as clamped contiguous with each other; but they may be separated by interposed plates or pieces which do not extend to the working edge or face, this matter depending upon the number of cuts to be made to the inch on the surface of the stone. Attached to the supporting or clamping plates is a handle H, which the workman grasps in operating the tool.

The water and sand or other material are applied to the stone during the operation of the tool in the ordinary manner well known to those skilled in the art of sawing stone.

In the operation of the tool the guide, which is clamped upon the stone, directs the tool in straight lines as it reciprocates back and forth over the surface. The reciprocation of the tool wears the grooves in the surface of the stone to the desired depth. The tool operates by rubbing or abrading the surface into the form of grooves, and I do not limit myself to the particular form of the tool herein shown.

I claim as my invention—

1. In an apparatus for grooving stone, a tool consisting of a series of vertically-arranged plates clamped together, the edges of said plates being curved, whereby a grooved working face is provided, substantially as described.

2. In an apparatus for grooving stone, a tool consisting of a series of vertically-arranged plates clamped together, the edge of said plates being curved to provide a grooved working face, and a guide independent of said tool adapted to be clamped to the stone, substantially as described.

In testimony whereof I affix my signature in presence of two witnesses.

JAMES H. EDSON.

Witnesses:
WM. SMITH, Jr.,
B. F. TAYLOR.